March 1, 1932. W. E. THATCHER 1,847,679
CHOCK BLOCK
Filed March 14, 1931
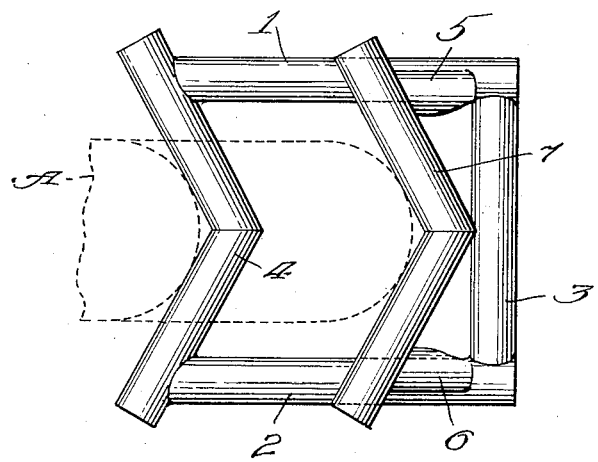
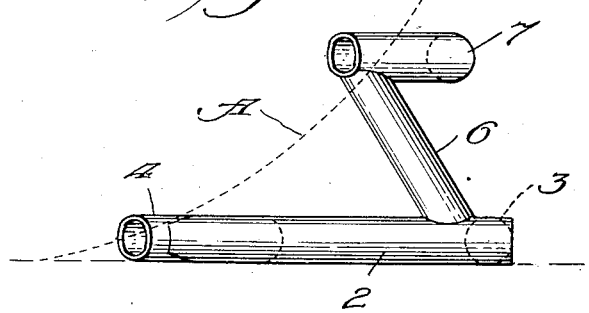
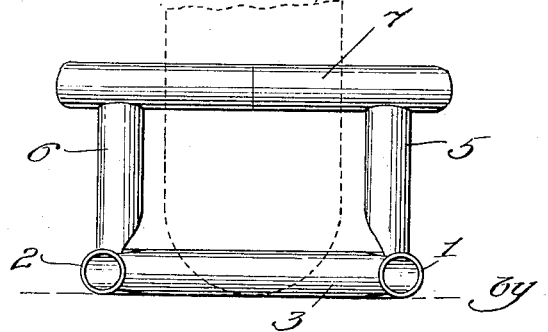

Patented Mar. 1, 1932

1,847,679

UNITED STATES PATENT OFFICE

WILBUR E. THATCHER, OF HINCKLEY, ILLINOIS

CHOCK BLOCK

Application filed March 14, 1931. Serial No. 522,717.

The present invention has for its object to produce a light, rugged and efficient portable chock block particularly adapted for cooperation with the ground wheels of airplanes or the like, although not limited to this use.

One of the annoyances to which flyers are frequently subjected is the difficulty of obtaining satisfactory chock block devices when landing elsewhere than in flying fields. Viewed in one of its aspects, my invention may be said to have for its object to produce a chock block of such a character that two or more can readily be carried by an airplane and be available for use in emergencies.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a device constructed in accordance with a preferred embodiment of my invention; Fig. 2 is a side view; and Fig. 3 is a front view; each figure showing in dotted lines a fragment of a wheel with which the block is engaged.

My improved block, generally speaking, consists of a base of any desired size and shape and an abutment, also of any desired size and shape, rising from the base, the entire structure being composed of tubing of steel or other suitable metal and being, therefore, strong and light.

In the particular arrangement or design shown in the drawings, the base is in the form of a frame having two tubular side or longitudinal members, 1 and 2, a front tubular member 3 and a rear tubular member 4; all of the frame members being welded or otherwise joined together. The rear member 4 is preferably shaped like a flattened V, with the apex directly forwardly; thus producing a seat which, when engaged with a tire, as indicated at A, will prevent lateral displacement of the tire as well as forward movement thereof.

The abutment illustrated consists of two parallel tubular uprights, 5 and 6, rising from the forward ends of the side members, 1 and 2, of the frame, respectively. These uprights are inclined rearwardly, preferably at an angle of about 30 degrees away from the vertical. The upper ends of the uprights are joined by another tubular member which is preferably similar and parallel to the frame member 4, being V-shaped and having its apex toward the front. When the tubular sections 5, 6 and 7 are separate pieces, they are welded to each other, and the sections 5 and 6 are welded to the frame-like base.

When the chock block is placed on the ground against the front of a wheel, the tire on the wheel may engage the V-shaped seats in both of the cross members 4 and 7 or, if the wheel be smaller than that shown, the tire may run up on the member 4 and rest in the seat in the upper cross member 7. In any event, the device will serve effectively to hold the wheel against forward movement and will be interlocked therewith so as to be prevented from slipping off sidewise.

Any one of the tubular members of the block may be grasped in the hand to lift or carry the block; to this extent serving as a handle. Or, if desired, a rope or cable (not shown) may be passed through the tubing 7 of two of the blocks, connecting them together so that they will be spaced apart a distance equal to that between two wheels when the cable is stretched, and preventing one or the other block from being lost or misplaced. The rope will also serve as a handle by which the chock block may be pulled out from under both wheels of a ship simultaneously.

It will thus be seen that I have produced an extremely simple and inexpensive chock block of small weight and great strength whose various elements serve as handles permitting the block to be readily grasped in the hand and carried about, or which may be roped to a companion block and be carried by the rope; making it particularly useful as a part of the equipment of an airplane.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A chock block comprising a base in the form of a tubular frame, and an abutment in the form of rearwardly inclined tubular uprights rising from the front end of the frame and connected at the top by a tubular cross piece.

2. A chock block composed of tubing joined to form a base of large area and an abutment rising therefrom.

3. A chock block comprising a base, uprights rising from the front end thereof, and a V-shaped cross piece connecting the upper ends of the uprights, the apex of the V being toward the front.

4. A chock block comprising a base, rearwardly inclined uprights rising from the front end thereof, and a V-shaped cross piece connecting the upper ends of the uprights, the apex of the V being toward the front.

5. In a chock block, a tubular frame constituting a base, the rear member of the frame being in the form of a V with its apex on the front side, rearwardly inclined tubular uprights rising from the front part of the frame, and a tubular cross piece connecting the upper ends of the uprights, said cross piece being in the form of a V having its apex toward the front.

In testimony whereof, I sign this specification.

WILBUR E. THATCHER.